(12) United States Patent
Cummings (10) Patent No.: US 7,560,299 B2
(45) Date of Patent: Jul. 14, 2009

(54) SYSTEMS AND METHODS OF ACTUATING MEMS DISPLAY ELEMENTS

(75) Inventor: William J. Cummings, San Francisco, CA (US)

(73) Assignee: IDC, LLC, San Francisco, CA (US)

( * ) Notice: Subject to any disclaimer, the term of this patent is extended or adjusted under 35 U.S.C. 154(b) by 502 days.

(21) Appl. No.: 11/159,073

(22) Filed: Feb. 25, 2005

(65) Prior Publication Data

US 2006/0057754 A1    Mar. 16, 2006

Related U.S. Application Data

(60) Provisional application No. 60/606,223, filed on Aug. 31, 2004, provisional application No. 60/604,896, filed on Aug. 27, 2004.

(51) Int. Cl.
*H01L 21/00* (2006.01)

(52) U.S. Cl. .................................. 438/48; 345/108

(58) Field of Classification Search ............. 438/38, 438/48, 50–53, 57; 345/84–90, 100, 108
See application file for complete search history.

(56) References Cited

U.S. PATENT DOCUMENTS

| | | | |
|---|---|---|---|
| 3,982,239 A | 9/1976 | Sherr | |
| 4,403,248 A | 9/1983 | te Velde | |
| 4,441,791 A | 4/1984 | Hornbeck | |
| 4,459,182 A | 7/1984 | te Velde | |
| 4,482,213 A | 11/1984 | Piliavin et al. | |
| 4,500,171 A | 2/1985 | Penz et al. | |
| 4,519,676 A | 5/1985 | te Velde | |
| 4,566,935 A | 1/1986 | Hornbeck | |
| 4,571,603 A | 2/1986 | Hornbeck et al. | |
| 4,596,992 A | 6/1986 | Hornbeck | |
| 4,615,595 A | 10/1986 | Hornbeck | |
| 4,662,746 A | 5/1987 | Hornbeck | |
| 4,681,403 A | 7/1987 | te Velde et al. | |
| 4,709,995 A | 12/1987 | Kuribayashi et al. | |
| 4,710,732 A | 12/1987 | Hornbeck | |
| 4,856,863 A | 8/1989 | Sampsell et al. | |
| 4,859,060 A | 8/1989 | Katagiri et al. | |
| 4,954,789 A | 9/1990 | Sampsell | |

(Continued)

FOREIGN PATENT DOCUMENTS

EP    0 295 802    12/1988

(Continued)

OTHER PUBLICATIONS

Peroulis et al., Low contact resistance series MEMS switches, 2002, pp. 223-226, vol. 1, IEEE MTT-S International icrowave Symposium Digest, New York, NY.

(Continued)

*Primary Examiner*—Brook Kebede
(74) *Attorney, Agent, or Firm*—Knobbe Martens Olson & Bear LLP (57) ABSTRACT

Methods of writing display data to MEMS display elements are configured to minimize charge buildup and differential aging. The methods may include writing data with opposite polarities, and periodically releasing and/or actuating MEMS elements during the display updating process. Actuating MEMS elements with potential differences higher than those used during normal display data writing may also be utilized.

6 Claims, 6 Drawing Sheets

U.S. PATENT DOCUMENTS

| | | | |
|---|---|---|---|
| 4,956,619 A | 9/1990 | Hornbeck | |
| 4,982,184 A | 1/1991 | Kirkwood | |
| 5,018,256 A | 5/1991 | Hornbeck | |
| 5,028,939 A | 7/1991 | Hornbeck et al. | |
| 5,037,173 A | 8/1991 | Sampsell et al. | |
| 5,055,833 A | 10/1991 | Hehlen et al. | |
| 5,061,049 A | 10/1991 | Hornbeck | |
| 5,078,479 A | 1/1992 | Vuilleumier | |
| 5,079,544 A | 1/1992 | DeMond et al. | |
| 5,083,857 A | 1/1992 | Hornbeck | |
| 5,096,279 A | 3/1992 | Hornbeck et al. | |
| 5,099,353 A | 3/1992 | Hornbeck | |
| 5,124,834 A | 6/1992 | Cusano et al. | |
| 5,142,405 A | 8/1992 | Hornbeck | |
| 5,142,414 A | 8/1992 | Koehler et al. | |
| 5,162,787 A | 11/1992 | Thompson et al. | |
| 5,168,406 A | 12/1992 | Nelson | |
| 5,170,156 A | 12/1992 | DeMond et al. | |
| 5,172,262 A | 12/1992 | Hornbeck | |
| 5,179,274 A | 1/1993 | Sampsell | |
| 5,192,395 A | 3/1993 | Boysel et al. | |
| 5,192,946 A | 3/1993 | Thompson et al. | |
| 5,206,629 A | 4/1993 | DeMond et al. | |
| 5,212,582 A | 5/1993 | Nelson | |
| 5,214,419 A | 5/1993 | DeMond et al. | |
| 5,214,420 A | 5/1993 | Thompson et al. | |
| 5,216,537 A | 6/1993 | Hornbeck | |
| 5,226,099 A | 7/1993 | Mignardi et al. | |
| 5,227,900 A | 7/1993 | Inaba et al. | |
| 5,231,532 A | 7/1993 | Magel et al. | |
| 5,233,385 A | 8/1993 | Sampsell | |
| 5,233,456 A | 8/1993 | Nelson | |
| 5,233,459 A | 8/1993 | Bozler et al. | |
| 5,254,980 A | 10/1993 | Hendrix et al. | |
| 5,272,473 A | 12/1993 | Thompson et al. | |
| 5,278,652 A | 1/1994 | Urbanus et al. | |
| 5,280,277 A | 1/1994 | Hornbeck | |
| 5,287,096 A | 2/1994 | Thompson et al. | |
| 5,296,950 A | 3/1994 | Lin et al. | |
| 5,305,640 A | 4/1994 | Boysel et al. | |
| 5,312,513 A | 5/1994 | Florence et al. | |
| 5,323,002 A | 6/1994 | Sampsell et al. | |
| 5,325,116 A | 6/1994 | Sampsell | |
| 5,327,286 A | 7/1994 | Sampsell et al. | |
| 5,331,454 A | 7/1994 | Hornbeck | |
| 5,339,116 A | 8/1994 | Urbanus et al. | |
| 5,365,283 A | 11/1994 | Doherty et al. | |
| 5,411,769 A | 5/1995 | Hornbeck | |
| 5,444,566 A | 8/1995 | Gale et al. | |
| 5,446,479 A | 8/1995 | Thompson et al. | |
| 5,448,314 A | 9/1995 | Heimbuch et al. | |
| 5,452,024 A | 9/1995 | Sampsell | |
| 5,454,906 A | 10/1995 | Baker et al. | |
| 5,457,493 A | 10/1995 | Leddy et al. | |
| 5,457,566 A | 10/1995 | Sampsell et al. | |
| 5,459,602 A | 10/1995 | Sampsell | |
| 5,461,411 A | 10/1995 | Florence et al. | |
| 5,488,505 A | 1/1996 | Engle | |
| 5,489,952 A | 2/1996 | Gove et al. | |
| 5,497,172 A | 3/1996 | Doherty et al. | |
| 5,497,197 A | 3/1996 | Gove et al. | |
| 5,499,062 A | 3/1996 | Urbanus | |
| 5,506,597 A | 4/1996 | Thompson et al. | |
| 5,515,076 A | 5/1996 | Thompson et al. | |
| 5,517,347 A | 5/1996 | Sampsell | |
| 5,523,803 A | 6/1996 | Urbanus et al. | |
| 5,526,051 A | 6/1996 | Gove et al. | |
| 5,526,172 A | 6/1996 | Kanack | |
| 5,526,688 A | 6/1996 | Boysel et al. | |
| 5,535,047 A | 7/1996 | Hornbeck | |
| 5,548,301 A | 8/1996 | Kornher et al. | |
| 5,551,293 A | 9/1996 | Boysel et al. | |
| 5,552,924 A | 9/1996 | Tregilgas | |
| 5,552,925 A | 9/1996 | Worley | |
| 5,563,398 A | 10/1996 | Sampsell | |
| 5,567,334 A | 10/1996 | Baker et al. | |
| 5,570,135 A | 10/1996 | Gove et al. | |
| 5,578,976 A | 11/1996 | Yao | |
| 5,581,272 A | 12/1996 | Conner et al. | |
| 5,583,688 A | 12/1996 | Hornbeck | |
| 5,589,852 A | 12/1996 | Thompson et al. | |
| 5,597,736 A | 1/1997 | Sampsell | |
| 5,598,565 A | 1/1997 | Reinhardt | |
| 5,600,383 A | 2/1997 | Hornbeck | |
| 5,602,671 A | 2/1997 | Hornbeck | |
| 5,606,441 A | 2/1997 | Florence et al. | |
| 5,608,468 A | 3/1997 | Gove et al. | |
| 5,610,438 A | 3/1997 | Wallace et al. | |
| 5,610,624 A | 3/1997 | Bhuva | |
| 5,610,625 A | 3/1997 | Sampsell | |
| 5,612,713 A | 3/1997 | Bhuva et al. | |
| 5,619,061 A | 4/1997 | Goldsmith et al. | |
| 5,619,365 A | 4/1997 | Rhoads et al. | |
| 5,619,366 A | 4/1997 | Rhoads et al. | |
| 5,629,790 A | 5/1997 | Neukermans et al. | |
| 5,633,652 A | 5/1997 | Kanbe et al. | |
| 5,636,052 A | 6/1997 | Arney et al. | |
| 5,638,084 A | 6/1997 | Kalt | |
| 5,638,946 A | 6/1997 | Zavracky | |
| 5,646,768 A | 7/1997 | Kaeiyama | |
| 5,650,881 A | 7/1997 | Hornbeck | |
| 5,654,741 A | 8/1997 | Sampsell et al. | |
| 5,657,099 A | 8/1997 | Doherty et al. | |
| 5,659,374 A | 8/1997 | Gale, Jr. et al. | |
| 5,665,997 A | 9/1997 | Weaver et al. | |
| 5,745,193 A | 4/1998 | Urbanus et al. | |
| 5,745,281 A | 4/1998 | Yi et al. | |
| 5,754,160 A | 5/1998 | Shimizu et al. | |
| 5,771,116 A | 6/1998 | Miller et al. | |
| 5,784,189 A | 7/1998 | Bozler et al. | |
| 5,784,212 A | 7/1998 | Hornbeck | |
| 5,808,780 A | 9/1998 | McDonald | |
| 5,818,095 A | 10/1998 | Sampsell | |
| 5,828,367 A | 10/1998 | Kuga | |
| 5,835,255 A | 11/1998 | Miles | |
| 5,842,088 A | 11/1998 | Thompson | |
| 5,867,302 A | 2/1999 | Fleming et al. | |
| 5,912,758 A | 6/1999 | Knipe et al. | |
| 5,943,158 A | 8/1999 | Ford et al. | |
| 5,959,763 A | 9/1999 | Bozler et al. | |
| 5,966,235 A | 10/1999 | Walker et al. | |
| 5,986,796 A | 11/1999 | Miles | |
| 6,028,690 A | 2/2000 | Carter et al. | |
| 6,038,056 A | 3/2000 | Florence et al. | |
| 6,040,937 A | 3/2000 | Miles | |
| 6,049,317 A | 4/2000 | Thompson et al. | |
| 6,055,090 A | 4/2000 | Miles | |
| 6,061,075 A | 5/2000 | Nelson et al. | |
| 6,099,132 A | 8/2000 | Kaeriyama | |
| 6,100,872 A | 8/2000 | Aratani et al. | |
| 6,113,239 A | 9/2000 | Sampsell et al. | |
| 6,147,790 A | 11/2000 | Meier et al. | |
| 6,160,833 A | 12/2000 | Floyd et al. | |
| 6,180,428 B1 | 1/2001 | Peeters et al. | |
| 6,201,633 B1 | 3/2001 | Peeters et al. | |
| 6,232,936 B1 | 5/2001 | Gove et al. | |
| 6,275,326 B1 | 8/2001 | Bhalla et al. | |
| 6,282,010 B1 | 8/2001 | Sulzbach et al. | |
| 6,295,154 B1 | 9/2001 | Laor et al. | |
| 6,304,297 B1 | 10/2001 | Swan | |
| 6,323,982 B1 | 11/2001 | Hornbeck | |
| 6,327,071 B1 | 12/2001 | Kimura | |
| 6,356,085 B1 | 3/2002 | Ryat et al. | |
| 6,356,254 B1 | 3/2002 | Kimura | |

| | | |
|---|---|---|
| 6,429,601 B1 | 8/2002 | Friend et al. |
| 6,433,917 B1 | 8/2002 | Mei et al. |
| 6,447,126 B1 | 9/2002 | Hornbeck |
| 6,465,355 B1 | 10/2002 | Horsley |
| 6,466,358 B2 | 10/2002 | Tew |
| 6,473,274 B1 | 10/2002 | Maimone et al. |
| 6,480,177 B2 | 11/2002 | Doherty et al. |
| 6,496,122 B2 | 12/2002 | Sampsell |
| 6,501,107 B1 | 12/2002 | Sinclair et al. |
| 6,507,330 B1 | 1/2003 | Handschy et al. |
| 6,507,331 B1 | 1/2003 | Schlangen et al. |
| 6,543,286 B2 * | 4/2003 | Garverick et al. ......... 73/514.18 |
| 6,545,335 B1 | 4/2003 | Chua et al. |
| 6,548,908 B2 | 4/2003 | Chua et al. |
| 6,549,338 B1 | 4/2003 | Wolverton et al. |
| 6,552,840 B2 | 4/2003 | Knipe |
| 6,574,033 B1 | 6/2003 | Chui et al. |
| 6,589,625 B1 | 7/2003 | Kothari et al. |
| 6,593,934 B1 | 7/2003 | Liaw et al. |
| 6,600,201 B2 | 7/2003 | Hartwell et al. |
| 6,606,175 B1 | 8/2003 | Sampsell et al. |
| 6,625,047 B2 | 9/2003 | Coleman, Jr. |
| 6,630,786 B2 | 10/2003 | Cummings et al. |
| 6,632,698 B2 | 10/2003 | Ives |
| 6,636,187 B2 | 10/2003 | Tajima et al. |
| 6,643,069 B2 | 11/2003 | Dewald |
| 6,650,455 B2 | 11/2003 | Miles |
| 6,666,561 B1 | 12/2003 | Blakley |
| 6,674,090 B1 | 1/2004 | Chua et al. |
| 6,674,562 B1 | 1/2004 | Miles |
| 6,680,792 B2 | 1/2004 | Miles |
| 6,710,908 B2 | 3/2004 | Miles et al. |
| 6,741,377 B2 | 5/2004 | Miles |
| 6,741,384 B1 | 5/2004 | Martin et al. |
| 6,741,503 B1 | 5/2004 | Farris et al. |
| 6,747,785 B2 | 6/2004 | Chen et al. |
| 6,762,873 B1 | 7/2004 | Coker et al. |
| 6,775,174 B2 | 8/2004 | Huffman et al. |
| 6,778,155 B2 | 8/2004 | Doherty et al. |
| 6,781,643 B1 | 8/2004 | Watanabe et al. |
| 6,787,384 B2 | 9/2004 | Okumura |
| 6,787,438 B1 | 9/2004 | Nelson |
| 6,788,520 B1 | 9/2004 | Behin et al. |
| 6,794,119 B2 | 9/2004 | Miles |
| 6,811,267 B1 | 11/2004 | Allen et al. |
| 6,813,060 B1 | 11/2004 | Garcia et al. |
| 6,819,469 B1 | 11/2004 | Koba |
| 6,822,628 B2 | 11/2004 | Dunphy et al. |
| 6,829,132 B2 | 12/2004 | Martin et al. |
| 6,853,129 B1 | 2/2005 | Cummings et al. |
| 6,855,610 B2 | 2/2005 | Tung et al. |
| 6,859,218 B1 | 2/2005 | Luman et al. |
| 6,861,277 B1 | 3/2005 | Monroe et al. |
| 6,862,022 B2 | 3/2005 | Slupe |
| 6,862,029 B1 | 3/2005 | D'Souza et al. |
| 6,867,896 B2 | 3/2005 | Miles |
| 6,870,581 B2 | 3/2005 | Li et al. |
| 6,903,860 B2 | 6/2005 | Ishii |
| 7,034,783 B2 | 4/2006 | Gates et al. |
| 7,110,158 B2 * | 9/2006 | Miles ......................... 359/291 |
| 7,123,216 B1 | 10/2006 | Miles |
| 7,161,728 B2 | 1/2007 | Sampsell et al. |
| 2001/0003487 A1 | 6/2001 | Miles |
| 2001/0026250 A1 | 10/2001 | Inoue et al. |
| 2001/0043171 A1 | 11/2001 | Van Gorkom et al. |
| 2001/0046081 A1 | 11/2001 | Hayashi et al. |
| 2001/0051014 A1 | 12/2001 | Behin et al. |
| 2002/0000959 A1 | 1/2002 | Colgan et al. |
| 2002/0005827 A1 | 1/2002 | Kobayashi |
| 2002/0012159 A1 | 1/2002 | Tew |
| 2002/0015215 A1 | 2/2002 | Miles |
| 2002/0024711 A1 | 2/2002 | Miles |
| 2002/0036304 A1 | 3/2002 | Ehmke et al. |
| 2002/0050882 A1 | 5/2002 | Conklin |
| 2002/0054424 A1 | 5/2002 | Miles et al. |
| 2002/0075226 A1 | 6/2002 | Lippincott |
| 2002/0075555 A1 | 6/2002 | Miles |
| 2002/0093722 A1 | 7/2002 | Chan et al. |
| 2002/0097133 A1 | 7/2002 | Charvet et al. |
| 2002/0101769 A1 * | 8/2002 | Garverick et al. ........... 365/200 |
| 2002/0126364 A1 | 9/2002 | Miles |
| 2002/0179421 A1 | 12/2002 | Williams et al. |
| 2002/0186108 A1 | 12/2002 | Hallbjorner |
| 2003/0004272 A1 | 1/2003 | Power |
| 2003/0043157 A1 | 3/2003 | Miles |
| 2003/0072070 A1 | 4/2003 | Miles |
| 2003/0122773 A1 | 7/2003 | Washio et al. |
| 2003/0137215 A1 | 7/2003 | Cabuz |
| 2003/0137521 A1 | 7/2003 | Zehner et al. |
| 2003/0189536 A1 | 10/2003 | Ruigt |
| 2003/0202264 A1 | 10/2003 | Weber et al. |
| 2003/0202265 A1 | 10/2003 | Reboa et al. |
| 2003/0202266 A1 | 10/2003 | Ring et al. |
| 2004/0008396 A1 | 1/2004 | Stappaerts |
| 2004/0022044 A1 | 2/2004 | Yasuoka et al. |
| 2004/0027701 A1 | 2/2004 | Ishikawa |
| 2004/0051929 A1 | 3/2004 | Sampsell et al. |
| 2004/0058532 A1 | 3/2004 | Miles et al. |
| 2004/0080807 A1 | 4/2004 | Chen et al. |
| 2004/0145049 A1 | 7/2004 | McKinnell et al. |
| 2004/0145553 A1 | 7/2004 | Sala et al. |
| 2004/0147056 A1 | 7/2004 | McKinnell et al. |
| 2004/0160143 A1 | 8/2004 | Shreeve et al. |
| 2004/0174583 A1 | 9/2004 | Chen et al. |
| 2004/0179281 A1 | 9/2004 | Reboa |
| 2004/0212026 A1 | 10/2004 | Van Brocklin et al. |
| 2004/0217378 A1 | 11/2004 | Martin et al. |
| 2004/0217919 A1 | 11/2004 | Pichl et al. |
| 2004/0218251 A1 | 11/2004 | Piehl et al. |
| 2004/0218334 A1 | 11/2004 | Martin et al. |
| 2004/0218341 A1 | 11/2004 | Martin et al. |
| 2004/0223204 A1 | 11/2004 | Mao et al. |
| 2004/0227493 A1 | 11/2004 | Van Brocklin et al. |
| 2004/0240032 A1 | 12/2004 | Miles |
| 2004/0240138 A1 | 12/2004 | Martin et al. |
| 2004/0245588 A1 | 12/2004 | Nikkel et al. |
| 2004/0263944 A1 | 12/2004 | Miles et al. |
| 2005/0001828 A1 | 1/2005 | Martin et al. |
| 2005/0012577 A1 | 1/2005 | Pillans et al. |
| 2005/0038950 A1 | 2/2005 | Adelmann |
| 2005/0057442 A1 | 3/2005 | Way |
| 2005/0068583 A1 | 3/2005 | Gutkowski et al. |
| 2005/0069209 A1 | 3/2005 | Damera-Venkata et al. |
| 2005/0116924 A1 | 6/2005 | Sauvante |
| 2005/0206991 A1 | 9/2005 | Chui et al. |
| 2005/0286113 A1 | 12/2005 | Miles |
| 2005/0286114 A1 | 12/2005 | Miles |
| 2006/0044246 A1 | 3/2006 | Mignard |
| 2006/0044298 A1 | 3/2006 | Mignard et al. |
| 2006/0044928 A1 | 3/2006 | Chui et al. |
| 2006/0056000 A1 | 3/2006 | Mignard |
| 2006/0066542 A1 | 3/2006 | Chui |
| 2006/0066559 A1 | 3/2006 | Chui et al. |
| 2006/0066560 A1 | 3/2006 | Gally et al. |
| 2006/0066561 A1 | 3/2006 | Chui et al. |
| 2006/0066594 A1 | 3/2006 | Tyger |
| 2006/0066597 A1 | 3/2006 | Sampsell |
| 2006/0066598 A1 | 3/2006 | Floyd |
| 2006/0066601 A1 | 3/2006 | Kothari |
| 2006/0066937 A1 | 3/2006 | Chui |
| 2006/0066938 A1 | 3/2006 | Chui |
| 2006/0067648 A1 | 3/2006 | Chui et al. |
| 2006/0067653 A1 | 3/2006 | Gally et al. |
| 2006/0077505 A1 | 4/2006 | Chui et al. |
| 2006/0077520 A1 | 4/2006 | Chui et al. |
| 2006/0103613 A1 | 5/2006 | Chui |

| | | | |
|---|---|---|---|
| 2006/0250335 A1 | 11/2006 | Stewart et al. | |
| 2006/0250350 A1 | 11/2006 | Kothari et al. | |

FOREIGN PATENT DOCUMENTS

| | | | |
|---|---|---|---|
| EP | 0295802 A | 12/1988 | |
| EP | 0300754 A2 | 1/1989 | |
| EP | 0608056 A1 | 1/1989 | |
| EP | 0318050 A | 5/1989 | |
| EP | 0 417 523 A | 3/1991 | |
| EP | 0 467 048 A | 1/1992 | |
| EP | 0570906 A | 11/1993 | |
| EP | 0 306 308 B1 | 4/1994 | |
| EP | 0655725 A1 | 5/1995 | |
| EP | 0 667 548 A1 | 8/1995 | |
| EP | 0725380 A1 | 8/1996 | |
| EP | 0852371 A1 | 7/1998 | |
| EP | 0911794 A1 | 4/1999 | |
| EP | 1 017 038 A | 7/2000 | |
| EP | 1 146 533 A | 10/2001 | |
| EP | 1 239 448 | 9/2002 | |
| EP | 1 280 129 | 1/2003 | |
| EP | 1343190 A | 9/2003 | |
| EP | 1345197 A | 9/2003 | |
| EP | 1381023 A | 1/2004 | |
| EP | 1 414 011 | 4/2004 | |
| EP | 1473691 A2 | 11/2004 | |
| GB | 2401200 A | 11/2004 | |
| JP | 2004-29571 | 1/2004 | |
| WO | WO 95/30924 | 11/1995 | |
| WO | WO 97/17628 | 5/1997 | |
| WO | WO 99/52006 A3 | 10/1999 | |
| WO | WO 01/73937 A | 10/2001 | |
| WO | WO 02/089103 | 11/2002 | |
| WO | WO 03/007049 A1 | 1/2003 | |
| WO | WO 03/015071 A2 | 2/2003 | |
| WO | WO 03/044765 A2 | 5/2003 | |
| WO | WO 03/060940 A | 7/2003 | |
| WO | WO 03/069413 A1 | 8/2003 | |
| WO | WO 03/073151 A1 | 9/2003 | |
| WO | WO 03/079323 A | 9/2003 | |
| WO | WO 03/090199 A1 | 10/2003 | |
| WO | WO 2004/006003 A1 | 1/2004 | |
| WO | WO 2004/026757 A | 4/2004 | |
| WO | WO 2004/026757 A2 | 4/2004 | |
| WO | WO 2004/049034 A1 | 6/2004 | |
| WO | WO 2004/054088 | 6/2004 | |

OTHER PUBLICATIONS

Bains, "Digital Paper Display Technology holds Promise for Portables", CommsDesign EE Times (2000).
Lieberman, "MEMS Display Looks to give PDAs Sharper Image" EE Times (2004).
Lieberman, "Microbridges at heart of new MEMS displays" EE Times (2004).
International Preliminary Report on Patentability dated Mar. 8, 2007.
Miles, MEMS-based interferometric modulator for display applications, Part of the SPIE Conference on Micromachined Devices and Components, vol. 3876, pp. 20-28 (1999).
Miles et al., 5.3: Digital Paper™: Reflective displays using interferometric modulation, SID Digest, vol. XXXI, 2000 pp. 32-35.
Chen et al., Low peak current driving scheme for passive matrix-OLED, SID International Symposium Digest of Technical Papers, May 2003, pp. 504-507.
IPRP for PCT/US05/029796 filed August 23, 2005.
Office Action dated Feb. 11, 2008 in U.S. Appl. No. 11/100,762.
Office Action dated Aug. 11, 2008 in U.S. Appl. No. 11/100,762.
Office Action dated Dec. 4, 2008 in U.S. Appl. No. 11/100,762.
Office Action dated Oct. 8, 2008 in U.S. Appl. No. 11/234,061.
Office Action dated May 9, 2008 for Chinese App. No. 200510103441.5.
Partial Search Report dated May 7, 2008 for European App. No. 05255639.6.
Extended Search Report dated Aug. 11, 2008 for European App. No. 05255639.6.
Seeger et al., "Stabilization of Electrostatically Actuated Mechanical Devices", (1997) International Conference on Solid State Sensors and Actuators; vol. 2, pp. 1133-1136.
Office Action dated Jun. 20, 2008 in Chinese App. No. 200580028766.X.

* cited by examiner

|  | Column Output Signals | |
|---|---|---|
|  | $+V_{bias}$ | $-V_{bias}$ |
| Row Output Signals  0 | Stable | Stable |
| $+\Delta V$ | Release | Actuate |

FIG. 8A

|  | Column Output Signals | |
|---|---|---|
|  | $+V_{bias}$ | $-V_{bias}$ |
| Row Output Signals  0 | Stable | Stable |
| $-\Delta V$ | Actuate | Release |

FIG. 8B

SYSTEMS AND METHODS OF ACTUATING MEMS DISPLAY ELEMENTS

CROSS REFERENCE TO RELATED APPLICATIONS

This application claims priority under 35 U.S.C. Section 119(e) to U.S. Provisional Patent Applications 60/606,223 filed on Aug. 31, 2004, and 60/604,896 filed on Aug. 27, 2004, which applications are hereby incorporated by reference in its entirety.

BACKGROUND

Microelectromechanical systems (MEMS) include micromechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. An interferometric modulator may comprise a pair of conductive plates, one or both of which may be transparent and/or reflective in whole or part and capable of relative motion upon application of an appropriate electrical signal. One plate may comprise a stationary layer deposited on a substrate, the other plate may comprise a metallic membrane separated from the stationary layer by an air gap. Such devices have a wide range of applications, and it would be beneficial in the art to utilize and/or modify the characteristics of these types of devices so that their features can be exploited in improving existing products and creating new products that have not yet been developed.

SUMMARY

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Embodiments" one will understand how the features of this invention provide advantages over other display devices.

In one embodiment, the invention comprises a method of actuating a MEMS display element, the MEMS display element comprising a portion of an array of MEMS display elements. The method may include actuating the MEMS display element with a potential difference of a first polarity during a first portion of a display write process, releasing said MEMS display element, and actuating the MEMS display element with a potential difference having a polarity opposite the first polarity during a second portion of the display write process. In one embodiment, the first portion of the display write process includes writing a first frame of display data to the array of MEMS display elements and the second portion of the display write process includes writing a second frame of display data to the array of MEMS display elements.

In another embodiment of the invention, a method of operating a MEMS element in an array of MEMS elements forming a display includes periodically applying a first potential difference to the MEMS element, the first potential difference having a magnitude sufficient to actuate the MEMS element, and having a polarity. The method may then periodically apply a second potential difference to the MEMS element, the second potential difference being of approximately equal magnitude and opposite polarity as the first potential difference. The first potential difference and the second potential difference are respectively applied to the MEMS element at defined times and for defined time durations that depend on a rate at which image data is written to MEMS elements of the array, and wherein the first and second potential differences are each applied to the MEMS element an approximately equal amount of time over a given period of display use. This method advantageously includes writing the same frame of data using both a potential differences of said first polarity and potential differences of said opposite polarity.

In another embodiment, a method of writing display data to an array of MEMS display elements includes actuating all MEMS elements in a portion of the array; and writing display data to the portion of the array. The portion may, for example, be a row of MEMS elements or the entire array of MEMS elements. The method may additionally include releasing all MEMS elements in the portion of the array prior to writing display data to the portion of the array.

In another embodiment, a method of writing display data to an array of MEMS display elements includes periodically actuating at least some elements of the MEMS elements with a potential difference greater than a potential difference used when actuating the MEMS elements during the process of writing display data to the MEMS elements.

In another embodiment, a system for writing data to an array of MEMS display elements includes a column driver and a row driver. The row driver and column driver are configured to periodically actuate at least some elements of the array with a potential difference greater than a potential difference used when actuating elements during a display writing process.

DETAILED DESCRIPTION OF PREFERRED EMBODIMENTS

The following detailed description is directed to certain specific embodiments of the invention. However, the invention can be embodied in a multitude of different ways. In this description, reference is made to the drawings wherein like parts are designated with like numerals throughout. As will be apparent from the following description, the invention may be implemented in any device that is configured to display an image, whether in motion (e.g., video) or stationary (e.g., still image), and whether textual or pictorial. More particularly, it is contemplated that the invention may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

Figure 1:
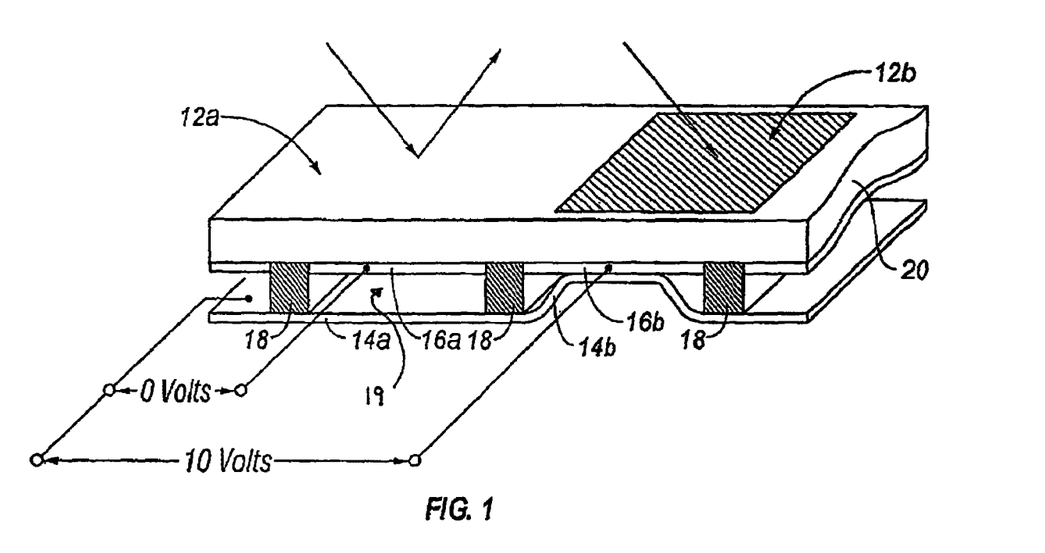
FIG. 1 is an isometric view depicting a portion of one embodiment of an interferometric modulator display in which a movable reflective layer of a first interferometric modulator is in a released position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the released state, the movable layer is positioned at a relatively large distance from a fixed partially reflective layer. In the second position, the movable layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable and highly reflective layer 14a is illustrated in a released position at a predetermined distance from a fixed partially reflective layer 16a. In the interferometric modulator 12b on the right, the movable highly reflective layer 14b is illustrated in an actuated position adjacent to the fixed partially reflective layer 16b.

The fixed layers 16a, 16b are electrically conductive, partially transparent and partially reflective, and may be fabricated, for example, by depositing one or more layers each of chromium and indium-tin-oxide onto a transparent substrate 20. The layers are patterned into parallel strips, and may form row electrodes in a display device as described further below. The movable layers 14a, 14b may be formed as a series of parallel strips of a deposited metal layer or layers (orthogonal to the row electrodes 16a, 16b) deposited on top of posts 18 and an intervening sacrificial material deposited between the posts 18. When the sacrificial material is etched away, the deformable metal layers are separated from the fixed metal layers by a defined air gap 19. A highly conductive and reflective material such as aluminum may be used for the deformable layers, and these strips may form column electrodes in a display device.

With no applied voltage, the cavity 19 remains between the layers 14a, 16a and the deformable layer is in a mechanically relaxed state as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable layer is deformed and is forced against the fixed layer (a dielectric material which is not illustrated in this Figure may be deposited on the fixed layer to prevent shorting and control the separation distance) as illustrated by the pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

Figure 2:
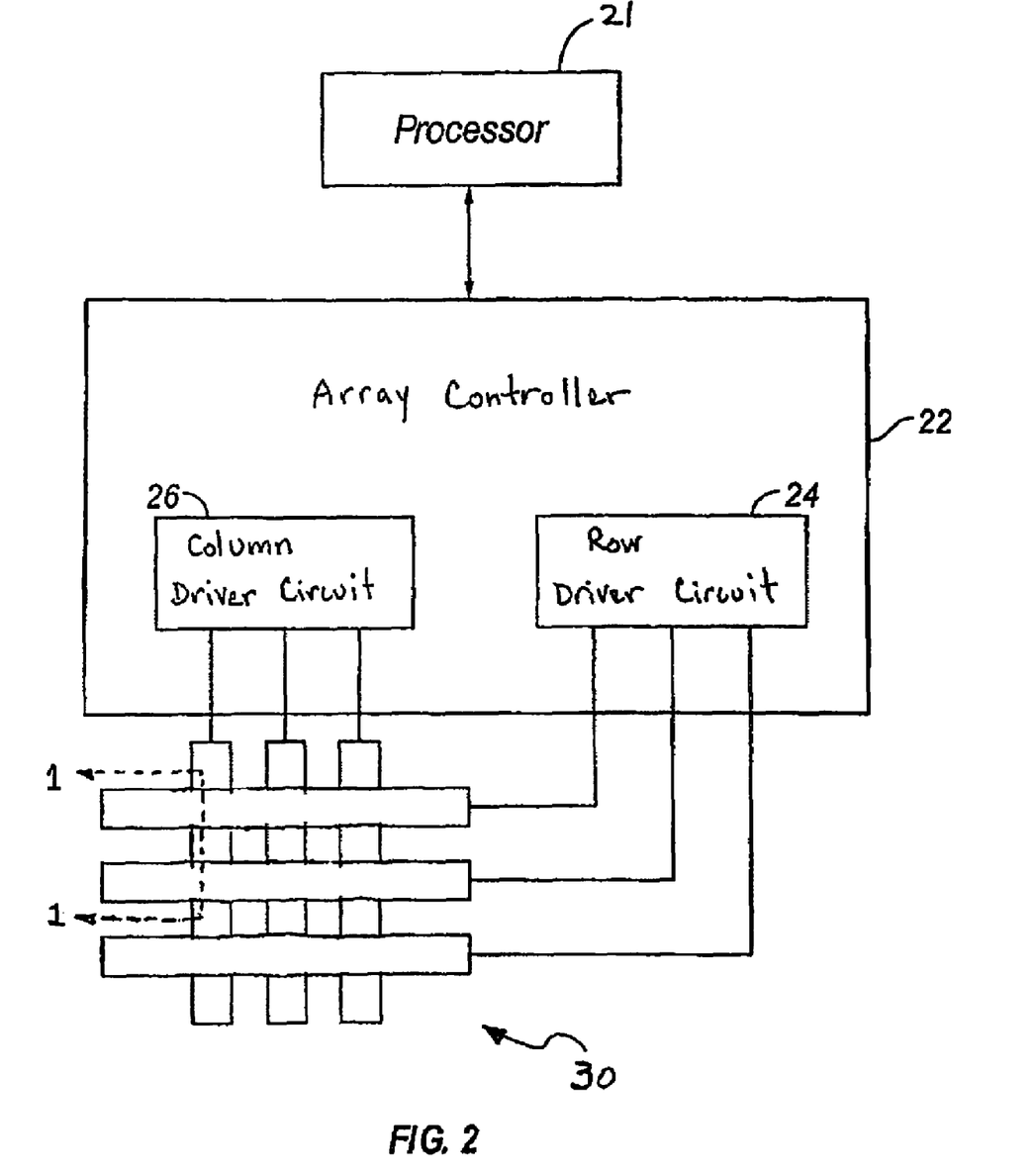
FIG. 2 is a system block diagram illustrating one embodiment of an electronic device incorporating a 3×3 interferometric modulator display.
Figure 3:
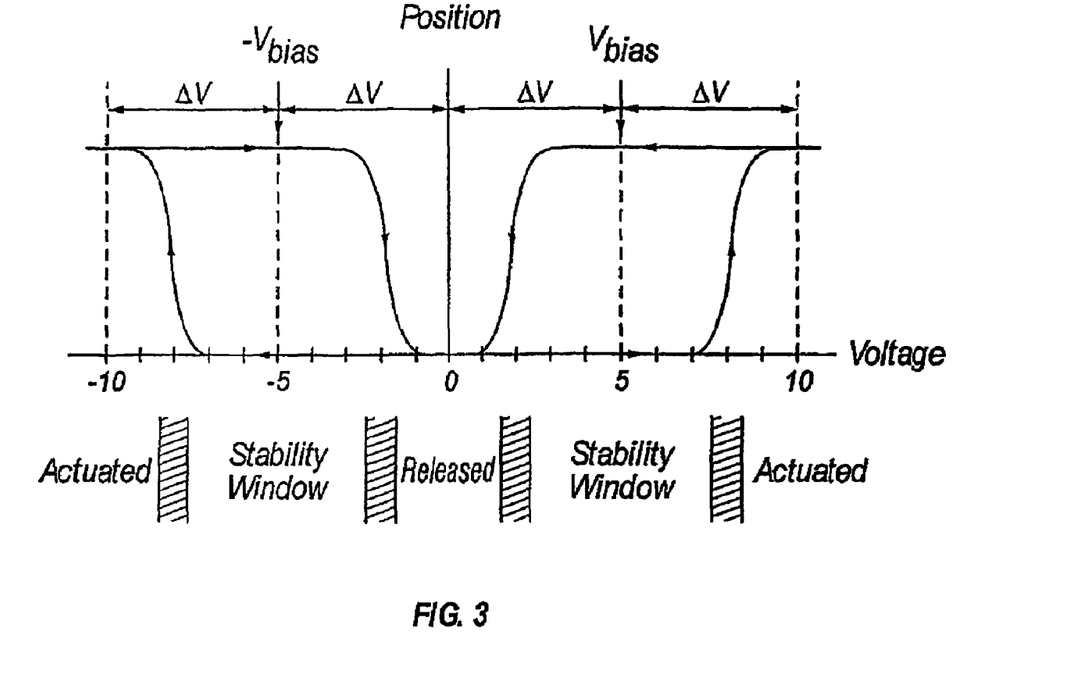
FIG. 3 is a diagram of movable mirror position versus applied voltage for one exemplary embodiment of an interferometric modulator of FIG. 1.

FIGS. 2 through 5 illustrate one exemplary process and system for using an array of interferometric modulators in a display application. FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array controller 22. In one embodiment, the array controller 22 includes a row driver circuit 24 and a column driver circuit 26 that provide signals to a pixel array 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the released state to the actuated state. However, when the voltage is reduced from that value, the movable layer maintains its state as the voltage drops back below 10 volts. In the exemplary embodiment of FIG. 3, the movable layer does not release completely until the voltage drops below 2 volts. There is thus a range of voltage, about 3 to 7 V in the example illustrated in FIG. 3, where there exists a window of applied voltage within which the device is stable in either the released or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be released are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or released pre-existing state. Since each pixel of the interferometric modulator, whether in the actuated or released state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figure 4:
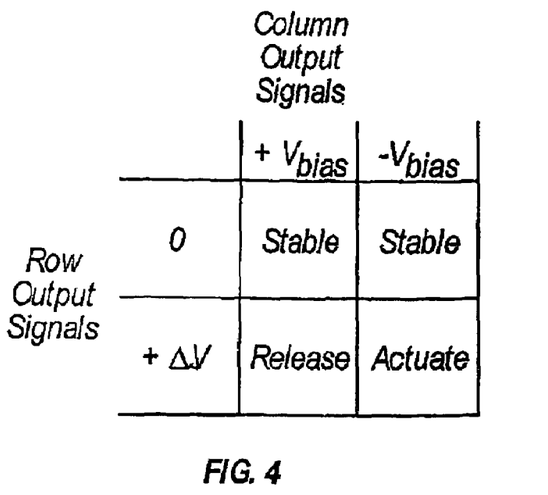
FIG. 4 is an illustration of a set of row and column voltages that may be used to drive an interferometric modulator display.
Figure 5A:
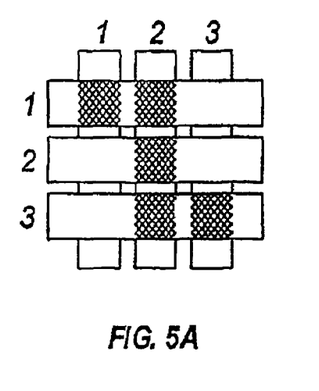
FIGS. 5A and 5B illustrate one exemplary timing diagram for row and column signals that may be used to write a frame of display data to the 3×3 interferometric modulator display of FIG. 2.
Figure 5B:
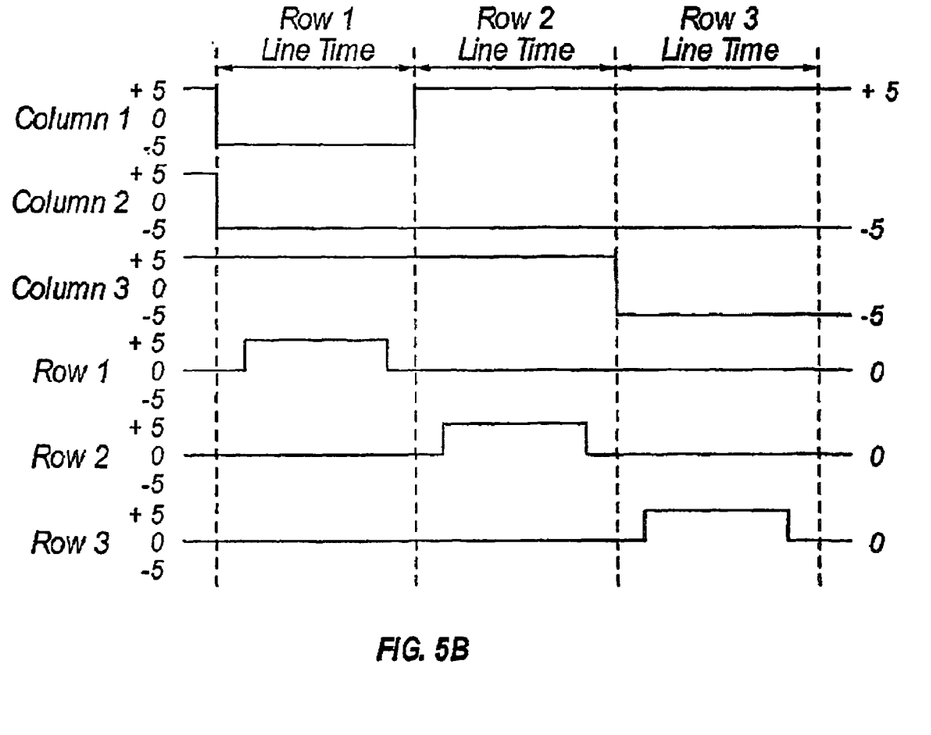

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts respectively Releasing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$.

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or released states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and releases the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and release pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the present invention. For example, it will be appreciated that the array elements may be driven with voltages that are shifted from the circuit common voltage of the array driving circuit such that the row might go from 6.2 to 6.2V+$V_{bias}$ and similarly the column would switch from a low voltage e.g. 1V to 1V+2*$V_{bias}$. In this embodiment, the release voltage may be slightly different from zero volts. It can be as large as a couple of volts but is typically less than one volt.

Figure 6A:
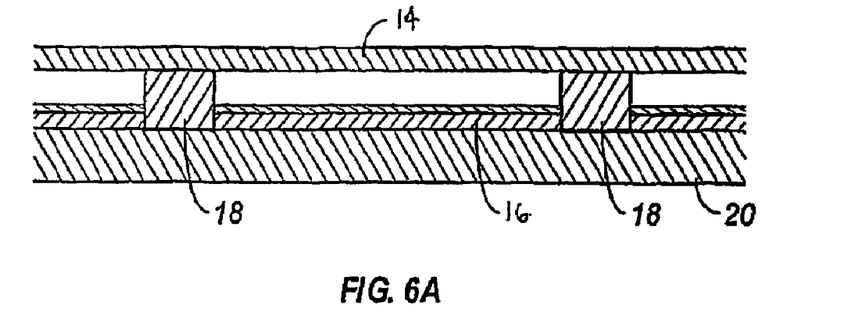
FIG. 6A is a cross section of the device of FIG. 1.
Figure 6B:
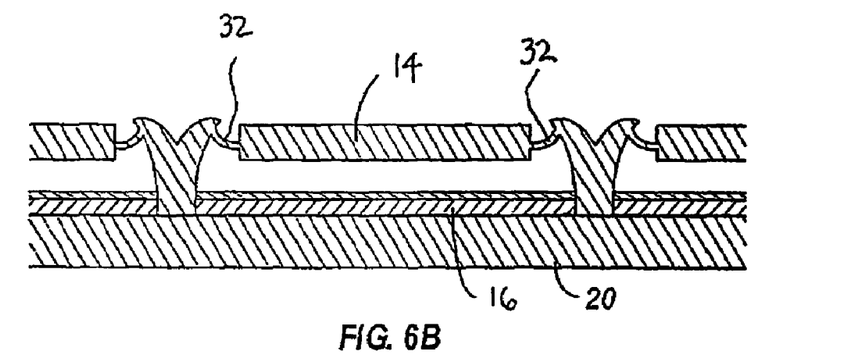
FIG. 6B is a cross section of an alternative embodiment of an interferometric modulator.
Figure 6C:
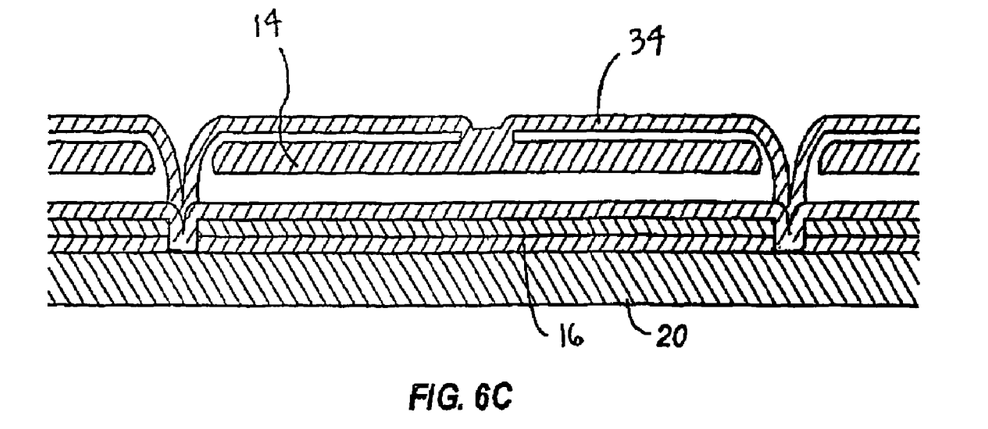
FIG. 6C is a cross section of another alternative embodiment of an interferometric modulator.

The details of the structure of interferometric modulators that operate in accordance with the principles set forth above may vary widely. For example, FIGS. 6A-6C illustrate three different embodiments of the moving mirror structure. FIG. 6A is a cross section of the embodiment of FIG. 1, where a strip of metal material 14 is deposited on orthogonally extending supports 18. In FIG. 6B, the moveable reflective material 14 is attached to supports at the corners only, on tethers 32. In FIG. 6C, the moveable reflective material 14 is suspended from a deformable layer 34. This embodiment has benefits because the structural design and materials used for the reflective material 14 can be optimized with respect to the optical properties, and the structural design and materials used for the deformable layer 34 can be optimized with respect to desired mechanical properties. The production of various types of interferometric devices is described in a variety of published documents, including, for example, U.S. Published Application 2004/0051929. A wide variety of well known techniques may be used to produce the above described structures involving a series of material deposition, patterning, and etching steps.

It is one aspect of the above described devices that charge can build on the dielectric between the layers of the device, especially when the devices are actuated and held in the actuated state by an electric field that is always in the same direction. For example, if the moving layer is always at a higher potential relative to the fixed layer when the device is actuated by potentials having a magnitude larger than the outer threshold of stability, a slowly increasing charge buildup on the dielectric between the layers can begin to shift the hysteresis curve for the device. This is undesirable as it causes display performance to change over time, and in different ways for different pixels that are actuated in different ways over time. As can be seen in the example of FIG. 5B, a given pixel sees a 10 volt difference during actuation, and every time in this example, the row electrode is at a 10 V higher potential than the column electrode. During actuation, the electric field between the plates therefore always points in one direction, from the row electrode toward the column electrode.

This problem can be reduced by actuating the MEMS display elements with a potential difference of a first polarity during a first portion of the display write process, and actuating the MEMS display elements with a potential difference having a polarity opposite the first polarity during a second portion of the display write process. This basic principle is illustrated in FIGS. 7, 8A, and 8B.

Figure 7:
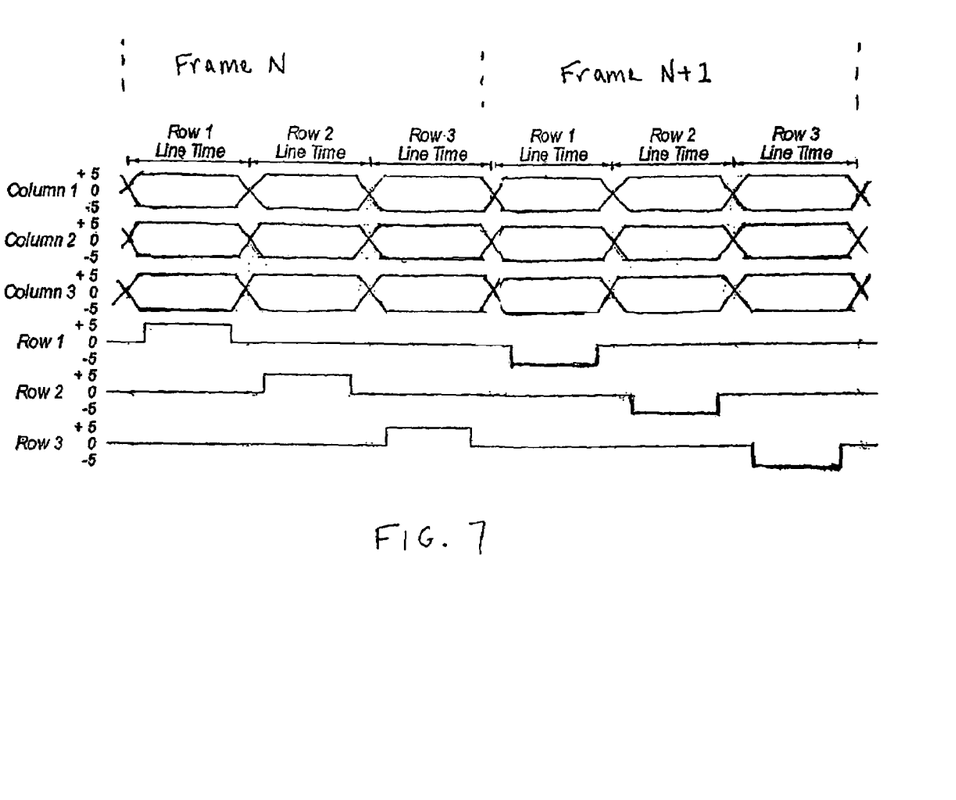
FIG. 7 is an exemplary timing diagram for row and column signals that may be used in one embodiment of the invention.
Figure 8A:
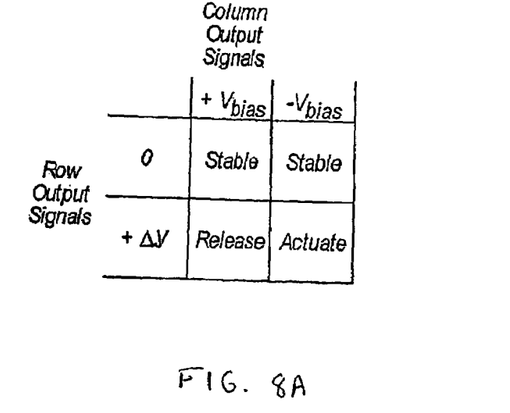
FIGS. 8A and 8B illustrate a sets of row and column voltages that may be used to drive an interferometric modulator display in one embodiment of the invention

In FIG. 7, two frames of display data are written in sequence, frame N and frame N+1. In this Figure, the data for the columns goes valid for row 1 (i.e., either +5 or −5 depending on the desired state of the pixels in row 1) during the row 1 line time, valid for row 2 during the row 2 line time, and valid for row 3 during the row 3 line time. Frame N is written as shown in FIG. 5B, which will be termed positive polarity herein, with the row electrode 10 V above the column electrode during MEMS device actuation. During actuation, the column electrode may be at −5 V, and the scan voltage on the row is +5 V in this example. The actuation and release for Frame N is thus performed according to the table in FIG. 8A, which is the same as FIG. 4.

Figure 8B:
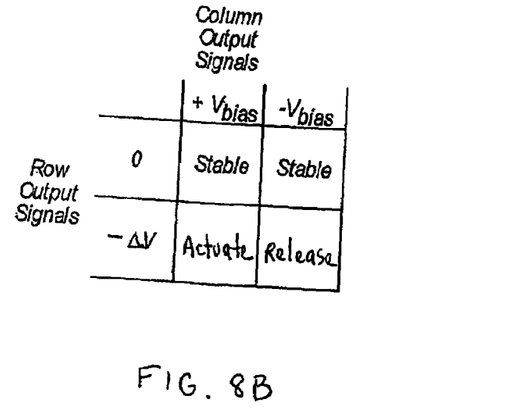

Frame N+1 is written in accordance with the table in FIG. 8B. For Frame N+1, the scan voltage is −5 V, and the column voltage is set to +5 V to actuate, and −5 V to release. Thus, in Frame N+1, the column voltage is 10 V above the row voltage, termed a negative polarity herein. As the display is continually refreshed and/or updated, the polarity can be alternated between frames, with Frame N+2 being written in the same manner as Frame N, Frame N+3 written in the same manner as Frame N+1, and so on. In this way, actuation of pixels takes place in both polarities. In embodiments following this principle, potentials of opposite polarities are respectively applied to a given MEMS element at defined times and for defined time durations that depend on the rate at which image data is written to MEMS elements of the array, and the opposite potential differences are each applied an approximately equal amount of time over a given period of display use. This helps reduce charge buildup on the dielectric over time.

A wide variety of modifications of this scheme can be implemented. For example, Frame N and Frame N+1 can comprise different display data. Alternatively, it can be the same display data written twice to the array with opposite polarities. It can also be advantageous to dedicate some frames to setting the state of all or substantially all pixels to a released state, and/or setting the state of all or substantially all the pixels to an actuated state prior to writing desired display data. Setting all the pixels to a common state can be performed in a single row line time by, for example, setting all the columns to +5 V (or −5 V) and scanning all the rows simultaneously with a −5 V scan (or +5 V scan).

In one such embodiment, desired display data is written to the array in one polarity, all the pixels are released, and the same display data is written a second time with the opposite polarity. This is similar to the scheme illustrated in FIG. 7, with Frame N the same as Frame N+1, and with an array releasing line time inserted between the frames. In another embodiment, each display update of new display data is preceded by a releasing row line time.

In another embodiment, a row line time is used to actuate all the pixels of the array, a second line time is used to release all the pixels of the array, and then the display data (Frame N for example) is written to the display. In this embodiment, Frame N+1 can be preceded by an array actuation line time and an array release line time of opposite polarities to the ones preceding Frame N, and then Frame N+1 can be written. In some embodiments, an actuation line time of one polarity, a release line time of the same polarity, an actuation line time of opposite polarity, and a release line time of opposite polarity can precede every frame. These embodiments ensure that all or substantially all pixels are actuated at least once for every frame of display data, reducing differential aging effects as well as reducing charge buildup.

In some cases, it may be advantageous to use an extra high actuation voltage during the array actuation line times. For example, during the array actuation line times described above, the row scan voltages can be 7 V or 10 V instead of 5 V. In this embodiment, the highest voltages applied to the pixel occur during these "over-actuation" array actuation times, and not during display data updates. This can also help reduce differential aging effects for different pixels, some of which may change frequently during display updates, whereas others may change very infrequently during display updates, depending on the images being displayed.

It is also possible to perform these polarity reversals and actuation/release protocols on a row by row basis. In these embodiments, each row of a frame may be written more than once during the frame writing process. For example, when writing row 1 of Frame N, the pixels of row 1 could all be released, and the display data for row 1 can be written with positive polarity. The pixels of row 1 could be released a second time, and the row 1 display data written again with negative polarity. Actuating all the pixels of row 1 as described above for the whole array could also be performed. It will further be appreciated that the releases, actuations, and over-actuations may be performed at a lower frequency than every row write or every frame write during the display updating/refreshing process.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As one example, it will be appreciated that the test voltage driver circuitry could be separate from the array driver circuitry used to create the display. As with current sensors, separate voltage sensors could be dedicated to separate row electrodes. The scope of the invention is indicated by the appended claims rather than by the foregoing description. All changes which come within the meaning and range of equivalency of the claims are to be embraced within their scope.

The invention claimed is:

1. A method of actuating a MEMS display element, said MEMS display element comprising a portion of an array of MEMS display elements, said method comprising:

writing display data of a first frame to said MEMS display element with only a potential difference of a first polarity during a display write process;

after said writing display data of a first frame, releasing said MEMS display element; and after said releasing, writing display data of a second frame to said MEMS display element with a potential difference having only a polarity opposite said first polarity during a second portion of said display write process, wherein each frame written during said display write process comprises different display data.

2. The method of claim 1, wherein one or more other frames of display data are written to said array between said first frame and said second frame.

3. The method of claim 1, comprising actuating said MEMS display element with a potential difference of said first polarity when writing a third frame during said display write process.

4. The method of claim 1, comprising alternately applying potential differences of opposite polarity to display elements of said array during alternating portions of said display write process.

5. The method of claim 4, wherein said alternating portions of said display write process comprise writing alternating frames of display data to said array of MEMS display elements.

6. The method of claim 5, wherein said alternating portions of said display write process comprise writing alternating rows of display data to said array of MEMS display elements.

* * * * *

UNITED STATES PATENT AND TRADEMARK OFFICE
CERTIFICATE OF CORRECTION

PATENT NO.        : 7,560,299 B2
APPLICATION NO.   : 11/159073
DATED             : July 14, 2009
INVENTOR(S)       : William J. Cummings It is certified that error appears in the above-identified patent and that said Letters Patent is hereby corrected as shown below:

On the title page, under OTHER PUBLICATIONS, please change "icrowave" to --Microwave--.

At column 8, line 65, in Claim 1, after "during", please delete "a second portion of".

Signed and Sealed this

Twenty-third Day of March, 2010

David J. Kappos
*Director of the United States Patent and Trademark Office*